May 31, 1966 B. E. SEALANDER 3,254,340

APPARATUS FOR COUPLING A RETURN SIGNAL SIMULATOR TO A RADAR UNIT

Filed Aug. 13, 1962 6 Sheets-Sheet 1

INVENTOR.
BERTRAM E. SEALANDER
BY John J. Sullivan
ATTORNEY

INVENTOR.
BERTRAM E. SEALANDER
BY John J. Sullivan
ATTORNEY

INVENTOR.
BERTRAM E. SEALANDER
BY John J. Sullivan
ATTORNEY

INVENTOR.
BERTRAM E. SEALANDER
BY John J. Sullivan
ATTORNEY

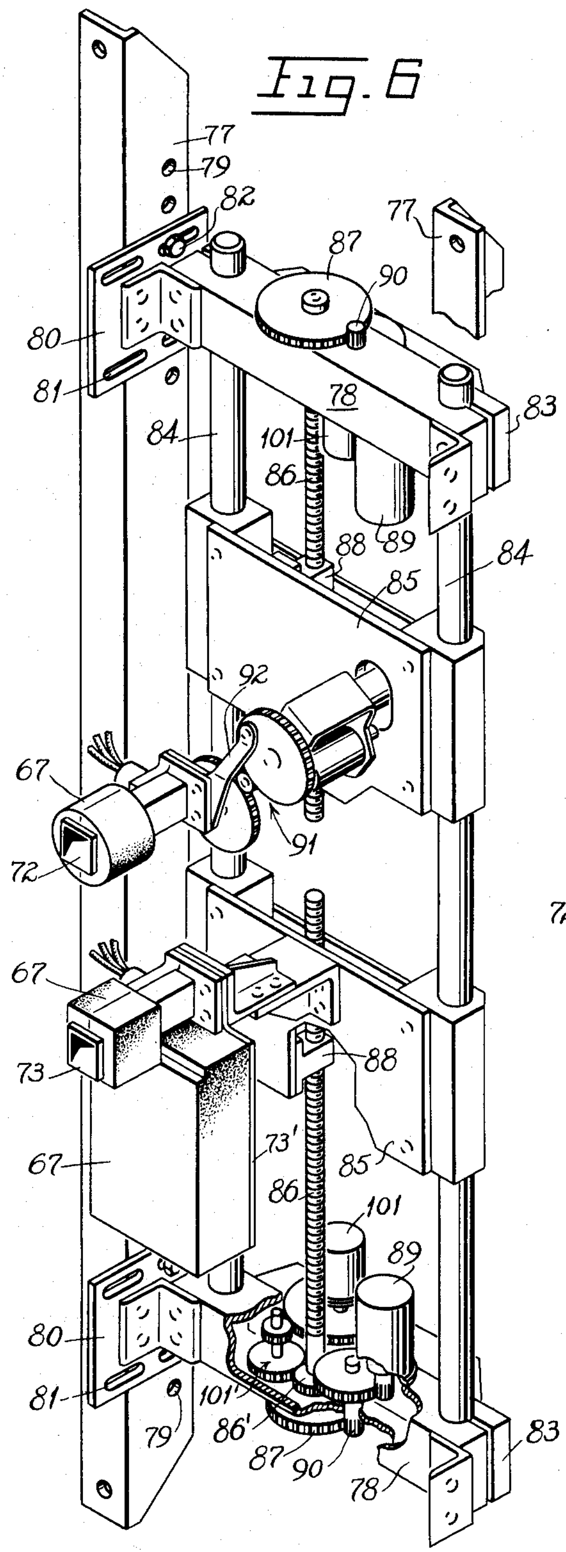
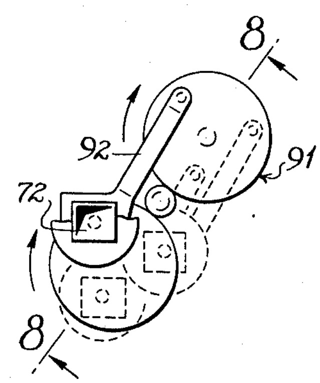
Fig. 7
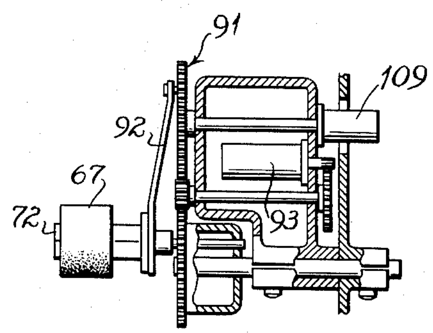
Fig. 8
INVENTOR.
BERTRAM E. SEALANDER
BY John J. Sullivan
ATTORNEY

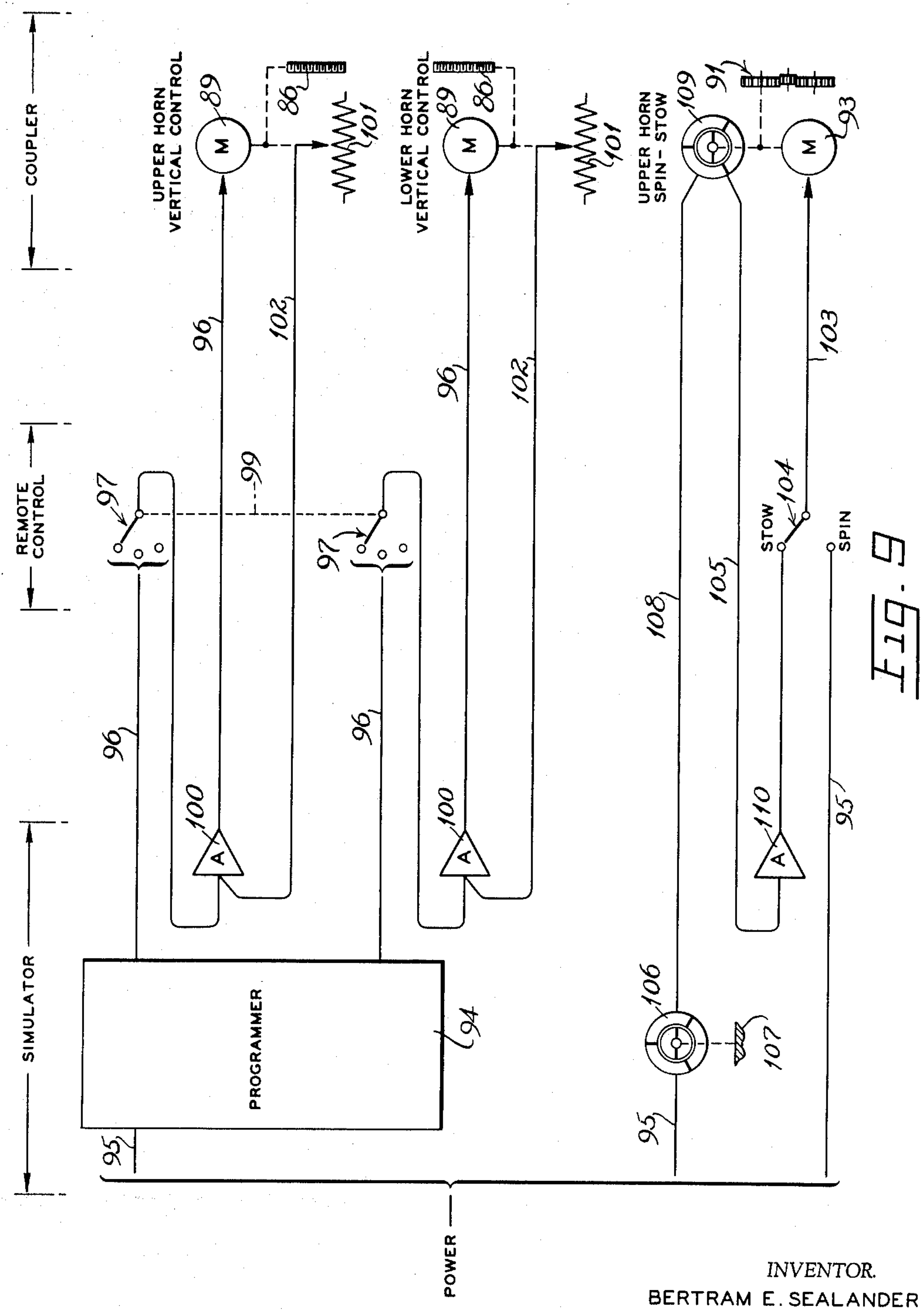
INVENTOR.
BERTRAM E. SEALANDER
BY John J. Sullivan
ATTORNEY

United States Patent Office 3,254,340

Patented May 31, 1966

1

3,254,340

APPARATUS FOR COUPLING A RETURN SIGNAL SIMULATOR TO A RADAR UNIT

Bertram E. Sealander, Merrick, N.Y., assignor, by mesne assignments, to Fairchild Hiller Corporation, Hagerstown, Md., a corporation of Maryland Filed Aug. 13, 1962, Ser. No. 216,505
3 Claims. (Cl. 343—17.7)

This invention relates broadly to coupling devices and, more particularly, to a coupler for associated electromagnetic energy-transmitting and -receiving devices, commonly called transponders, by which said energy is orientated or adjusted in form to facilitate its transmission and reception by such devices.

Among other things, the present invention contemplates a coupler of the type referred to above that is portable or mobile and may be readily interposed between and operationally connected to and disconnected from the associated devices.

Equipment has been heretofore developed to test the working condition and efficiency of radar units prior to their actual operation in service. These known testers dynamically check the several operating modes of the radar unit by receiving electromagnetic energy or signals therefrom and translating them into return signals simulating those to be received by the unit during actual service operation.

The form of phase front of the signals at the radar unit and at the target during actual operation is totally different due to the range and angular position or orientation. This is additionally complicated in tactical, airborne radar units where the target is either stationary or moving. In order to adequately simulate actual targets, the tester or simulator necessarily has been located at an appreciable distance from the equipment or radar unit under test. This creates several disadvantages in the test operation; for example, interference or clutter from reflection of spurious signals (usually called "ground effect") or from other nearby radar signals ("jamming") results; indoor tests are impossible where personnel hazards may exist; security problems may arise due to a leakage of the spurious signals capable of detection by nearby enemy equipment, etc.

It is, therefore, among the objects of this invention to overcome the foregoing objections as well as others in preoperational testing of such radar equipment. To this end, a coupler is herein proposed which is adapted to be readily interposed between the radar unit and the simulator to permit the complete test operation to be efficiently conducted within a minimum area. This has an additional advantage in that a single operator is capable of completing the entire test.

In essence, the present coupler comprises a relatively compact lens and antennae assembly to control the microwave beam passing between the radar unit and the simulator. The lens and antennae are relatively adjustable to positions corresponding to all positions in the several operating modes of the antenna of the radar to be tested and corresponding modes programmed in the simulator. Such adjustments are effected through associated mechanisms which may be operated by remote control, thereby permitting a single operator to accomplish the entire test.

The lens-antennae assembly is housed or mounted within an anechoic chamber whereby spurious signals are substantially absorbed rather than deflected. In addition, this assembly is appropriately mounted on a rollable chassis to render it readily mobile.

In operation, the coupler is brought into position between the radar unit and simulator, being located relative to and adjacent the antenna of the radar unit, and

2 the lens-antennae assembly is operatively connected to the unit and simulator. The radar unit is then energized and put through its several operations, prior to which the programmer of the simulator is adjusted according to the character of the operation being tested. Prior to each operating mode of the radar unit, the lens-antennae assembly is also adjusted to correspond to the setting of the simulator and radar. Such adjustment of the lens-antennae assembly may be accomplished automatically in response to adjustment of the simulator or independently.

It is noted that in the foregoing operation no physical connection is contemplated or required between the radar unit under test and the coupler. The coupler is, however, connected to the simulator through waveguides by which the microwave signals are transmitted in both directions.

With the above and other objects in view, as will be apparent, this invention consists in the construction, combination and arrangement of parts all as hereinafter more fully described, claimed and illustrated in the accompanying drawings, wherein:

FIG. 6 is a perspective of the antennae of the lens-antennae assembly and its mounting structure with parts thereof broken away to show actuating means for its vertical adjustment;

FIG. 7 is a schematic of the upper antenna shown in FIG. 6 to illustrate the manner in which it may be rotated;

FIG. 8 is a longitudinal section taken through the uper antenna to show the drive mechanism whereby its rotation is effected; and, FIG. 9 is a wiring diagram of the control circuitry by which the several positions of the antennae are adjusted.

Figure 1:
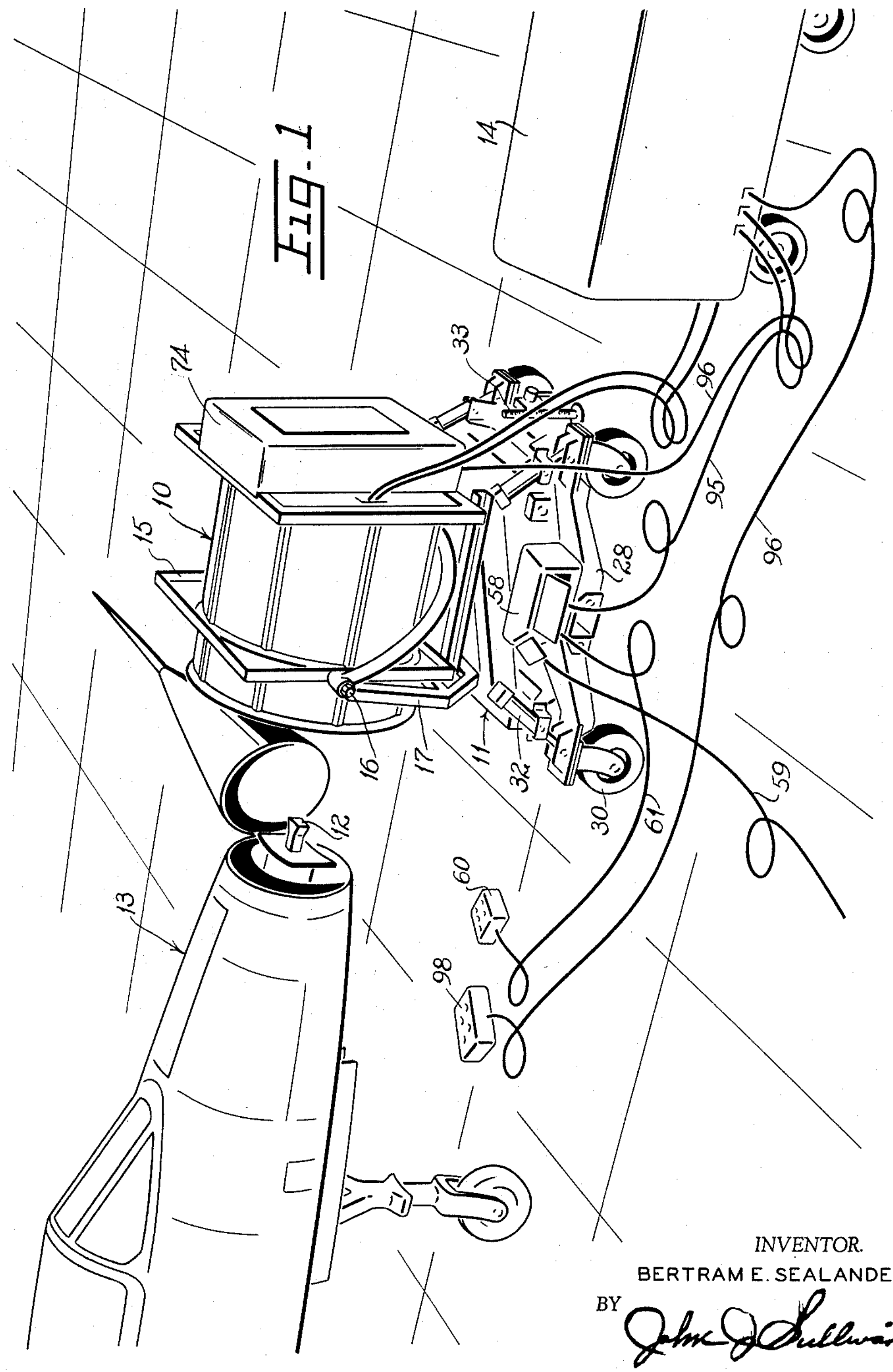
FIG. 1 is a perspective view from one side and to the rear of a coupler constructed in accordance with the teachings of the present invention as applied to a radar unit installed in a vehicle to show it operatively connected between the vehicle's radar unit and a simulator, only a fragment of the vehicle being illustrated.

Broadly, the present coupler comprises a lens-antennae assembly enclosed within a housing 10 mounted for relative movement on a supporting structure 11. In addition, the antennae within the housing 10 is independently adjustable relative to the lens and housing. Thus, the position of the coupler antennae is located with reference to the several operating modes of an antenna 12 of the radar equipment under test and the corresponding modes of a tester or simulator 14. For purposes of illustration, the equipment under test may be considered to be the navigation radar of a vehicle, for example, an airplane 13.

More specifically, the lens-antennae housing 10 is secured in a frame 15 that is pivotally mounted as at 16 adjacent its forward end in a cradle 17 which, in turn, is mounted on and connected to a carriage 18 adjacent its forward end through a power unit 19. The power unit 19 comprises a hydraulic cylinder suitably secured to the carriage 18 and disposed in a vertical position with its piston rod projecting therefrom in an upward direction. A mounting plate 20 adapted to be bolted or otherwise connected to the cradle 17 is attached to the outer end of the piston rod of cylinder 19. The power cylinder 19 thereby constitutes an elevation adjustment for the housing 10 and the lens-antennae assembly therein.

At the same time, the cylinder 19, being the single connection between the housing 10 and carriage 18 as above described, serves as a pivotal connection therebetween and constitutes an azimuth adjustment for the housing 10. A power drive for this adjustment is provided by a depending support 21 carried by the cradle 17 which includes a fixed nut 22 for coaction with a motor-driven screw jack 23 disposed at right angles to the support 21 and anchored at one of its ends to the carriage 18. Thus, operation of the screw jack 23 rotates the cradle 17 and housing 10 about the cylinder 19 relative to the carriage 18.

A pitch adjustment is also provided for the housing 10 in the form of a motor-driven screw jack 25 connected at one of its ends to the aft end of the cradle 17 and coacting at its other end in a fixed nut carried by and projecting from the housing frame 15. The screw jack 25 is thus disposed in a generally vertical position, and its operation serves to rotate the housing 10 on its pivot 16 to effect the desired pitch adjustment.

The carriage 18 is generally rectangular in shape and includes fore and aft bearing blocks 26, each of which coacts with and slides on an associated guide rod 27, one carried by and secured at its ends to each end of a chassis 28. Thus, the carriage 18, cradle 17, and housing 10 are slidable as a unit on the chassis 28, constituting a tranverse adjustment for the housing 10. This adjustment is powered by means of a motor-driven screw jack 29 disposed parallel to and between the guide rods 27 and anchored at one of its ends to the chassis 28. At its other end the screw jack 29 coacts with a fixed nut 18′ mounted on the carriage 18 whereby operation of the screw jack drives the carriage and its attachments laterally relative to the chassis 28.

The chassis 28 is provided with wheels 30 appropriately depending therefrom to render it mobile. Each wheel 30 is retractable as, for example, by and through a pivotal connection 31 on the chassis, and actuator means 32, for the rotation thereof on its pivot. The actuators 32 may each comprise a hydraulic cylinder operable through a fluid system associated with the operating system for the power unit 19, as will be explained.

Additional supports in the form of legs 33 are also appropriately connected to and depend from the chassis 28 on which the entire coupler rests in a stationary position when the wheels are retracted. Each of these legs 33 may comprise a motor-driven screw jack 34 rotatably mounted in a lug 35 fixedly carried by the chassis 28 whereby the length thereof is adjustable.

Specifically, three such legs 33 are employed, two at the front of the chassis 28, one adjacent each side, and a single leg 33 at the rear of the chassis in the center thereof. The single rear leg 33 may be independently and manually adjusted. The forward legs 33, however, are adapted to operate concurrently and in opposite direction whereby the entire coupler structure, including the chassis 28, carriage 18, cradle 17, and housing 10, rotate as a unit. This constitutes a roll adjustment of the housing 10.

To this end, the fixed lug 35 coacting with each of the screw jacks 34 of the forward legs 33 includes a peripheral gear 36 for coaction with an associated worm gear 37 mounted on the end of a drive shaft 38. The other ends of the drive shafts 38 terminate at the center of the chassis 28 in adjacent bevel gears 39, respectively.

A motor-driven drive gear 40 mounted on and carried by the chassis 28 meshes with both gears 39 whereby the operation thereof drives the shafts 38 concurrently in opposite directions, imparting a corresponding movement of the respective screw jacks 34. Thus, one forward leg 33 is lengthened while the other forward leg 33 is concurrently shortened, resulting in a tilting of the entire coupler on the single rear leg 33.

While the foregoing details of construction of the mobile chassis 28 and the several connections between the chassis 28, carriage 18, and housing 10, each in and of itself constitutes conventional engineering design, it is the combination thereof and the several positions of adjustment of the housing 10 through these mechanisms that constitute a feature of the invention. Through these several adjustments the coupler is adapted to be initially positioned with reference to the airplane 13 in which the radar or navigator equipment to be tested is housed and thereafter adjusted to correspond to the several modes of the radar unit and the corresponding modes of the associated simulator 14.

Figure 2:
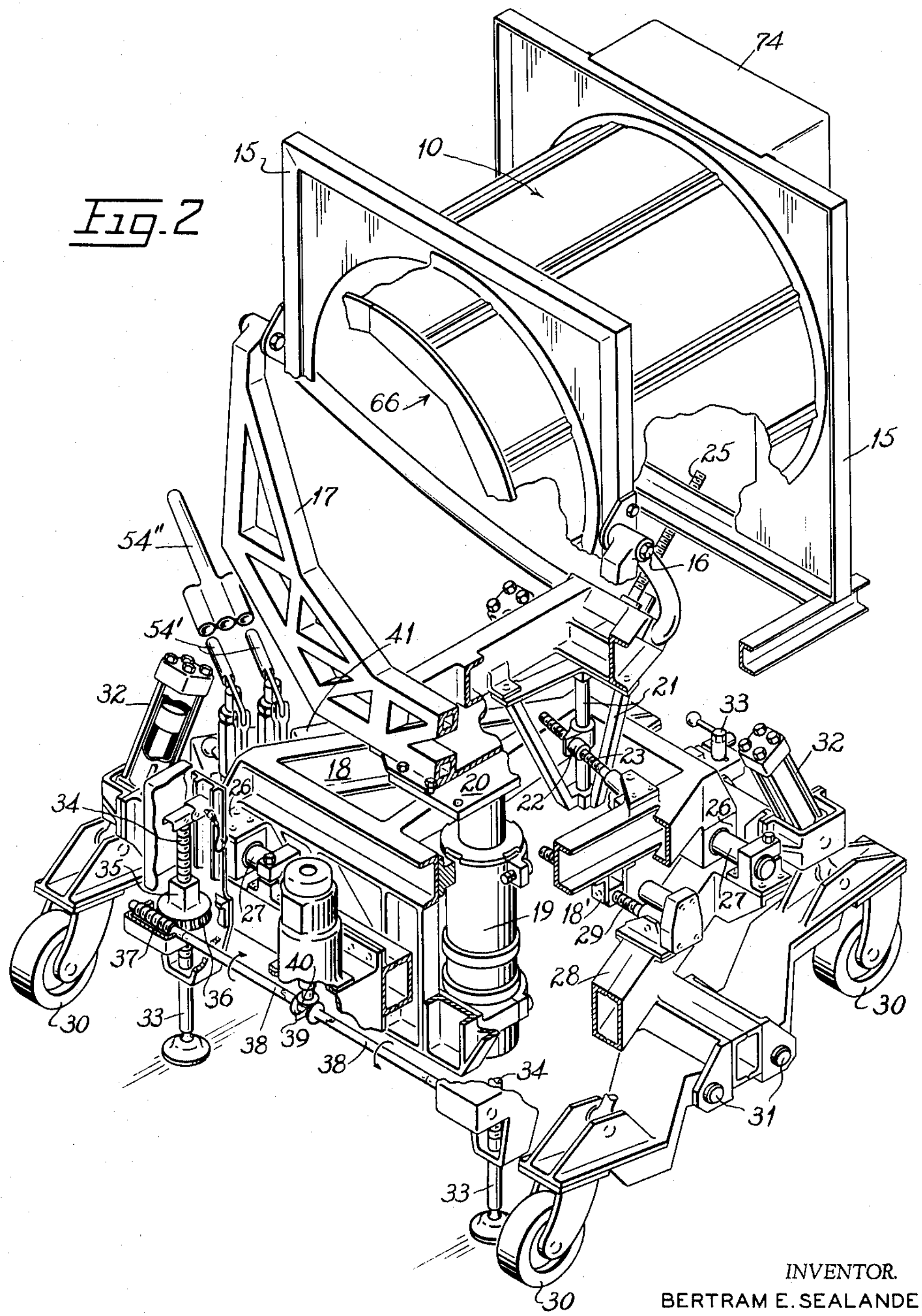
FIG. 2 is a perspective from the front of the coupler shown in FIG. 1 with parts broken away to disclose the several means for the adjustment of its lens-antennae assembly.
Figure 3:
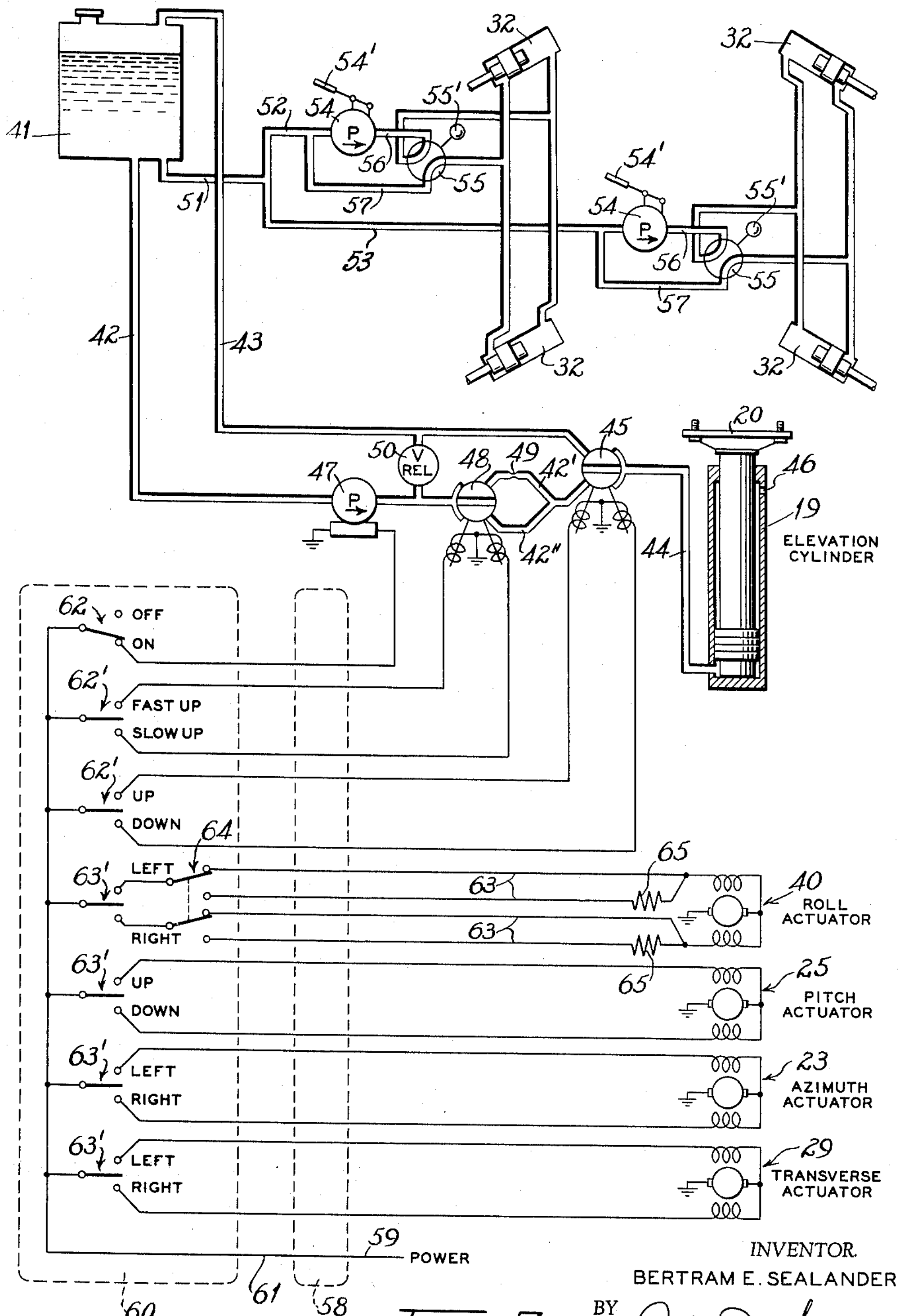
FIG. 3 is a schematic illustrating the control system for operation of the several adjusting devices by which the lens-antennae assembly is moved to and from positions corresponding to operating modes of the radar unit antenna and those simulated by the tester.
Figure 5:
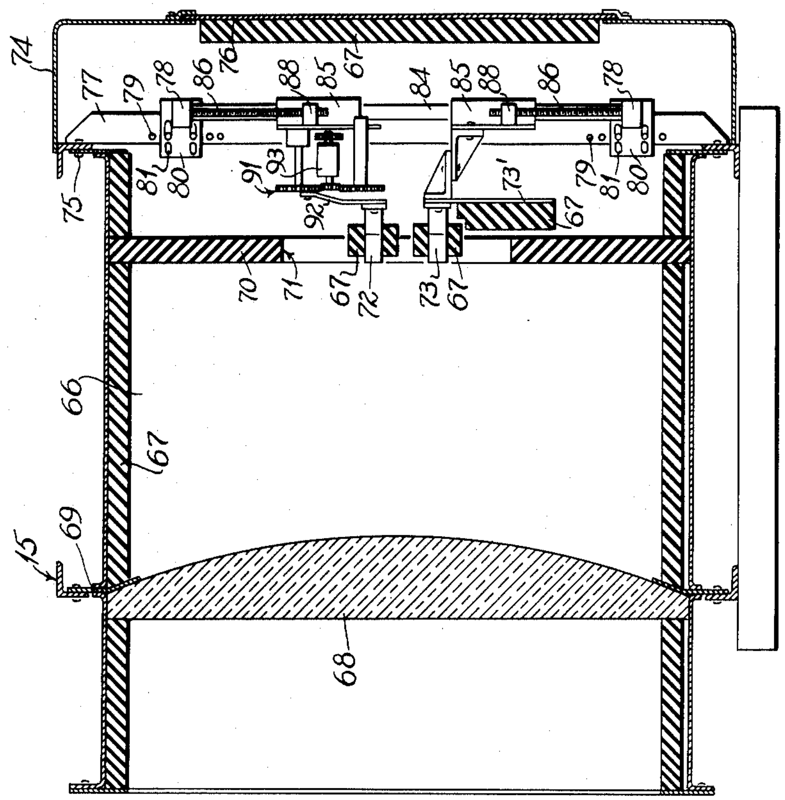
FIG. 5 is a section taken along line 5—5 of FIG. 4.
Figure 4:
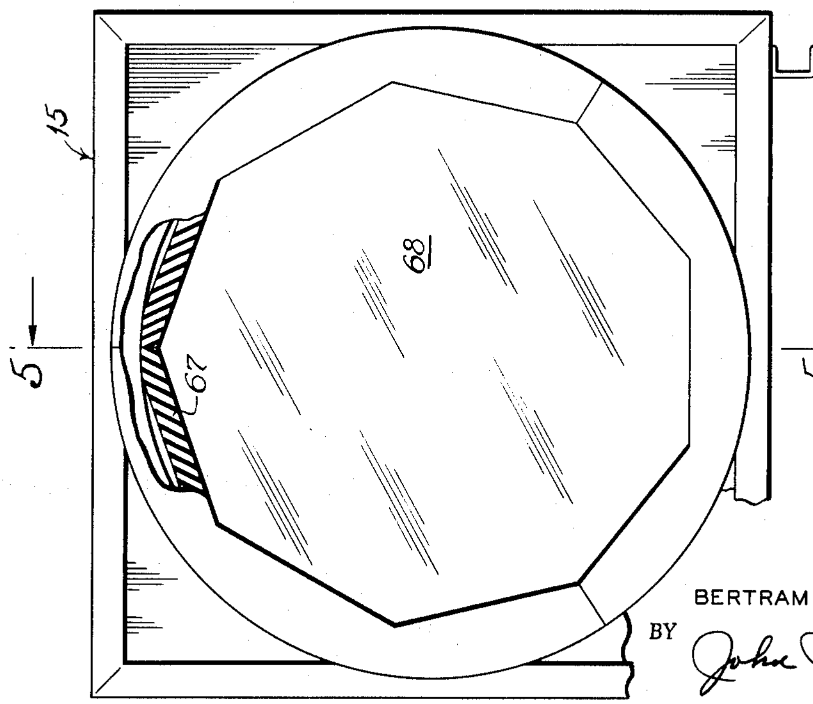
FIG. 4 is a front elevation of the lens-antennae assembly including its housing.

FIG. 3 shows the control system for operation of the several power actuators through which the various adjustments of the housing 10 are effected in the manner set forth above. To this end, a source of fluid, e.g., a container or tank 41, is connected through a feed and return line 42 and 43, respectively, to the lower end of the cylinder 19. The tank 41 may be mounted on and carried by the chassis 28 (FIG. 2).

The lines 42 and 43 terminate in a common feed/return line 44, being connected thereto through a three-way selector valve 45. The valve 45 is shown in the neutral or closed position blocking the flow of fluid between the cylinder 19 and tank 41. Upon operation in one direction, the valve 45 operatively connects feed line 42 to line 44 whereby the cylinder 19 may be extended to raise the cradle 17 and housing 10. A vent 46 open to atmosphere is provided in the opposite end of the cylinder 19 for the escape of air from the cylinder during its extension.

When the valve 45 is operated in the other direction, it operatively connects return line 43 to the line 44 whereby the cylinder 19 is retracted by gravity and the cradle 17 and housing 10 lowered.

In the feed line 42 between the tank 41 and the valve 45 is a pump 47 to pressurize the fluid from the tank to the cylinder 19 and a two-way selector valve 48 between the pump 47 and the valve 45. The feed line 42 on the outlet side of the valve 48 is divided into alternate lines 42′ and 42″ with restriction means 49 in one of the alternate lines, for example, line 42′, whereby the delivery rate of the pressurized fluid to the cylinder 19 may be selected to thereby control the speed of the operation of the cylinder in extending. A pressure relief valve 50 is provided in the feed line 42 between the pump 47 and the valve 48 communicating at its other end with the return line 43 for the ineffective circulation of fluid from the tank 41 therethrough when the valve 48 is closed.

A separate feed/return line 51 is connected between the tank 41 and the several cylinders 32, this line terminating in branches 52 and 53 individual to the fore and aft pairs of cylinders 32, respectively, of the coupler. Pump means 54 and a two-way selector valve 55 are operatively connected in each branch 52 and 53 whereby fluid is directed to either side of the piston operative in each cylinder 32.

Operation of each valve 55, for example, by means of and through a lever 55′, in one direction operatively connects its pressurized fluid line 56 to one end of the associated cylinders 32 and operatively connects its return line 57 to the opposite end of said cylinders. The pistons are thereby extended and retracted to raise and lower the individual wheels 30 of the coupler. The pumps 54 may be operated manually, for example, through an individual handle 54′ with a common lever 54″ (FIG. 2) connectible concurrently to both handles being provided to interconnect the handles 54′ for operation in unison whereby the retraction or extension of the several cylinders 32 is simultaneous.

The several power actuators for the adjustment and/or controlled movement of the housing 10 in all positions corresponding to operating modes of the equipment under test and simulated by the tester 14 are energized or controlled electrically. To this end a power distribution box 58 is mounted on and carried by the coupler, preferably the chassis 28, being connected by a power line 59 to a convenient source (not shown). The box 58 serves as a common connector for the power drive, illustrated in each case as a reversible electrical motor or solenoid actuated valve, associated with each actuator for adjustment and/or operation of the coupler, i.e., the cylinder 19 (elevation), screw jacks 23 (azimuth), 25 (pitch) and 29 (transverse) and gear 40 (roll) through appropriate leads or conductors connected in the conventional manner.

Selective operation of the foregoing motors or valves is effected through individual controls mounted on a common control panel 60 connected to the box 58 by appropriate conductor means 61 to permit remote operation thereof. The panel 60 includes an on-off switch 62 to energize the motor-driven pump 47 for delivery of pressurized fluid to the cylinder 19, as well as a three-way switch 62' individual to valves 45 and 48 for operation of the cylinder 19. A similar three-way switch 63' individual to each of the motor-driven screw jacks 23, 25 and 29 and gear 40 is also located on the panel 60. Thus, alternate positions of each switch 62' and 63' from its "off" position effects alternate operation of the associated valve 45 and 48 and the several actuators 19, 23, 25, 29 and 40.

If desired or required, alternate conductors as at 63 may be employed between the several actuators 23, 25, 29 and 40 and their respective switches 63' to control the speed of operation thereof. In this case, additional switching means 64 is operatively connected between the control switch 63' and its associated alternate conductors 63, and impedance means 65 is incorporated in one of the alternate conductors 63 associated with each direction of operation of the actuator. Thus, actuation of switching means 64 serves to energize the associated actuator motor either directly (full speed) or through an impedance 65 (relatively low speed) in both directions.

The housing 10 is in the form of a hollow cylinder and defines internally an anechoic chamber 66, the inner walls being lined as at 67 with microwave absorbent material. Adjacent the forward end of the chamber 66 is a dielectric lens 68 mounted transversely thereof as at 69. Adjacent its aft end the chamber 66 is closed by a transverse wall 70 also of microwave absorbent material. Centrally, the wall 70 is pierced by an opening 71 adapted to permit the passage therethrough of a pair of horns 72 and 73 of an antennae assembly mounted within and projecting laterally from an enclosure 74 attached as at 75 to the aft end of the housing 10. A central access opening normally closed by a removable door or cover 76 is provided in the enclosure 74. The inner surface of the cover 76, as well as the outer surface of each horn 72 and 73, is also lined with microwave absorbent material 67 to be thereby disposed in substantial, concentric alignment with the opening 71. The entire interior of the enclosure 74 is thereby effectively insulated to absorb substantially all signals entering the chamber 66 and not picked up by the horns 72 and 73.

The antennae assembly comprises a pair of aligned upright supports 77, each secured to a wall of the enclosure 74 and to which upper and lower transverse supporting beams 78 are removably secured (FIG. 6). Each upright 77 is provided with a series of openings 79 adjacent its ends, and the beams 78 are each provided with a fixed plate 80 at their respective ends adapted to abut the adjacent surfaces of the uprights. A plurality of slots 81 in each end plate 80 coacts with selected openings 79 in the adjacent upright whereby the relative position of the beams 78 is set and maintained by nut and bolt means 82.

At corresponding ends, the beams 78 are formed with clamp means 83 adapted to receive and to be secured to opposite ends of a guide rod 84. A pair of supports 85 is slidably mounted adjacent their ends on the guide rods 84 medially thereof between the beams 78. One of the horns 72 and 73 is mounted on each support 85 to project at right angles therefrom in the direction of the forward end of the housing 10. If desired, the lower horn mount may include a depending plate 73' adapted to be covered by or otherwise secure microwave absorbing material 67 to aid in acoustically insulating the interior of the enclosure 74.

The position of each support 85 is vertically adjustable on the guides 84 by means of and through a drive mechanism carried by the respective beams 78. Each such drive mechanism comprises a screw jack 86 mounted at one of its ends on the associated beam 78 where it terminates in a driven gear 87. At its other end, each screw jack 86 coacts with a fixed nut 88 carried by the associated slidable support 85 whereby rotation of the screw jack results in the vertical movement of that support on the guides 84. An electric motor 89 is mounted on each beam 78, and the drive shaft therefrom connects to a drive gear 90 in mesh with the associated driven gear 87 for the rotation of the screw jack 86.

Also mounted on each beam 78 is a potentiometer 101 connected through a driven gear train 101' to a drive gear 86' carried by the associated screw jack 86. Thus, each potentiometer 101 serves to limit the operation of its motor 89, as will become more apparent, and the vertical position of each horn 72 and 73 is adjusted within the chamber 66.

In addition, the upper horn 72 is mounted on its support 85 through a gear train 91 terminating in a pair of coplanar gears, to corresponding faces of which eccentric pivots project and connect one to the other through a link 92, the horn 72 being mounted on and projecting laterally from one end of said link. An associated motor 93 drives the gear train 91 in either direction whereby the horn-supporting link 92 is rotated in either a clockwise or counter-clockwise direction. Thus, the horn 72, in addition to the vertical movement on guides 84 previously described, also may be rotated. A synchro unit 109 appropriately connected to one of the coplanar gears serves to control the angular adjustment and position of the horn 72 when energized.

FIG. 9 shows the electrical circuitry by which the motors 89 and 93 are energized for the adjustment and operation of the horns 72 and 73. The radar equipment under test and the simulator 14 are thereby operatively connected during each operating mode for which the equipment is designed.

A programmer 94 within the simulator 14 contains the intelligence for each operation of the horns 72 and 73 as coordinated with the intelligence of the mechanism simulating each operating mode of the equipment under test. The programmer 94, as well as the entire simulator 14, is powered by a connecting line 95 from box 58. A conductor 96 connects the programmer 94 to each of the motors 89 for operation of its screw jack 86 to lineally drive the upper and lower horns 72 and 73. A selector switch 97 is connected in the length of each conductor 96 between the programmer 94 and each motor 89 with a contact for each of the several operations of the programmer 94. The selector switch 97 is mounted on a control panel 98 (FIG. 1) adapted for operation at a remote point. The wiper arms of both selector switches 97 are interconnected as at 99 for operation in unison. Also connected in the length of the conductor 96 between the switch 97 and the associated motor 89 is an amplifier 100 which converts the relatively low signal level intelligence from the programmer 94 to a power level sufficient to operate or drive each motor 89.

Each potentiometer 101 associated with and driven by the respective motors 89 is adjusted to a predetermined setting corresponding to the selected intelligence of the programmer 94. Each potentiometer 101 serves to control the operation of its motor by cancelling out the applied voltage through a feedback conductor 102 connecting the potentiometer to the input side of the amplifier 100 when the predetermined setting of the potentiometer is attained. Thus, when the selector switch 97 is set at the selected program operation, the associated motor 89 is energized to lineally adjust the position of the screw jack 86 to the setting of the programmer as controlled by the potentiometer 101. The motor 89 thereby automatically stops with the associated horn 72 or 73 located in the desired position.

In order to both rotate or spin the upper horn 72 and to angularly locate it in a predetermined fixed or stowed, out of the way position, the motor 93 is connected by a conductor 103 to power line 95. A two-position switch 104 is operatively connected to the end of conductor 103 with alternate contacts connecting it and the motor 93, either directly to power line 95 or to an alternate circuit 105 connected to power line 95 through a synchro unit 106 in the simulator 14. The synchro unit 106 is programmed or preset to a desired angular adjustment which when attained is maintained in the adjusted position by lock means 107. A conductor or lead 108 connects the programmed synchro unit 106 of the simulator 14 to a slave synchro unit 109 associated with the motor 93 and an amplifier 110. The motor 93 is thereby driven and concurrently drives slave unit 109 until it assumes the programmed position. The horn 72 is thus located in a predetermined, fixed, angular position, i.e., stowed.

The switch 104 is also mounted on the panel 98, and when it is desired to rotate the horn 72 it is actuated to connect the motor directly to power line 95 through lead 103. At other times the switch 104 is connected in the circuit 105 for the operation of the synchro units 106 and 109 to energize and drive the motor 93 for rotation of the horn 72 to a selected stowed position.

What is claimed is:

1. The combination with a tester for radar equipment including a transponder responsive to signals from said radar equipment and generating return signals corresponding to and simulating those received by the equipment during actual operation, of a coupler adapted to be connected to said tester and disposed adjacent and in spaced relation with said equipment, said coupler including a lens-antennae assembly and position-adjusting means therefor to orient the signals passing between the equipment and tester for reception and transmission thereby during each operating mode of the equipment and simulated by the tester, said lens-antennae assembly including a fixed lens adapted to be disposed adjacent said equipment, a pair of horns disposed in the focal plane and aft of said lens, means for vertically adjusting each of said horns relative to said lens, and a drive mechanism connected to one of said horns and operable to rotate it, a mobile supporting structure, variable length connections between said supporting structure and said lens-antennae assembly for relative movement thereof in multiple planes, and supporting legs carried by said structure and operative to render the structure immobile, said supporting legs comprising a pair of spaced, variable length supports adjacent one end of said supporting structure and a single support adjacent the opposite end of said supporting structure medially of said pair of supports, and a drive between said pair of supports for the simultaneous and opposite operation thereof to concurrently extend one end and shorten the other whereby the lens-antennae assembly is adjusted through a predetermined arc.

2. A coupler to operatively interconnect electromagnetic energy transponders temporarily comprising a unitary lens-antennae assembly adapted to be connected to one of said transponders and disposed adjacent and in spaced relation to the other of said transponders, means for adjusting the position of said assembly relative to said transponders in five planes, said means for adjusting including a mobile chassis, a carriage mounted and transversely adjustable on said chassis, a cradle pivotally mounted on said carriage, an extensible and retractable power unit connected between said cradle and carriage, a pivotal connection between said cradle and said lens-antennae assembly, and extensible and retractable means mounted on opposite sides of the chassis and concurrently operable in opposition between said chassis and a supporting surface, and means for the relative adjustment of the lens and antennae components of said assembly.

3. A coupler adapted to be operatively connected between a radar unit carried by a vehicle while at rest and a tester simulating return signals corresponding to those received by the unit when operating while the vehicle is in motion comprising a chassis, a carriage mounted on said chassis for transverse movement to selected relative positions, a vertically adjustable cradle rotatably mounted on said carriage, and a pivotally adjustable lens-antennae assembly mounted on said cradle, the lens and antennae of said assembly being relatively adjustable whereby signals passing between the radar unit and tester are oriented corresponding to each operating mode of the unit and simulated by the tester.

References Cited by the Examiner

UNITED STATES PATENTS

| | | | |
|---|---|---|---|
| 2,471,419 | 5/1949 | Edson et al. | 343—17.7 |
| 2,867,776 | 1/1959 | Wilkinson | 343—911 |
| 2,961,654 | 11/1960 | Simon | 343—17.7 |
| 3,040,310 | 6/1962 | Hausz | 343—779 |
| 3,165,742 | 1/1965 | Taylor | 343—17.7 |

CHESTER L. JUSTUS, *Primary Examiner.*

KATHLEEN CLAFFY, *Examiner.*

R. E. KLEIN, R. D. BENNETT, *Assistant Examiners.*